US011079999B2

(12) United States Patent
Chen

(10) Patent No.: US 11,079,999 B2
(45) Date of Patent: Aug. 3, 2021

(54) DISPLAY SCREEN FRONT PANEL OF HMD FOR VIEWING BY USERS VIEWING THE HMD PLAYER

(71) Applicant: Sony Interactive Entertainment Inc., Tokyo (JP)

(72) Inventor: Ruxin Chen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/392,589

(22) Filed: Apr. 23, 2019

(65) Prior Publication Data
US 2019/0286406 A1 Sep. 19, 2019

Related U.S. Application Data

(63) Continuation of application No. 15/631,212, filed on Jun. 23, 2017, now Pat. No. 10,268,438.

(60) Provisional application No. 62/357,348, filed on Jun. 30, 2016.

(51) Int. Cl.
*G09G 5/00* (2006.01)
*G06F 3/14* (2006.01)
*G06F 3/01* (2006.01)
*G02B 27/01* (2006.01)
*A63F 13/26* (2014.01)
*A63F 13/211* (2014.01)
*A63F 13/213* (2014.01)
*A63F 13/5255* (2014.01)
*A63F 13/212* (2014.01)
*G06K 9/00* (2006.01)

(52) U.S. Cl.
CPC .......... *G06F 3/1454* (2013.01); *A63F 13/211* (2014.09); *A63F 13/212* (2014.09); *A63F 13/213* (2014.09); *A63F 13/26* (2014.09); *A63F 13/5255* (2014.09); *G02B 27/017* (2013.01); *G06F 3/012* (2013.01); *G06K 9/00302* (2013.01); *G02B 2027/014* (2013.01); *G02B 2027/0138* (2013.01); *G02B 2027/0187* (2013.01); *G06F 3/013* (2013.01)

(58) Field of Classification Search
CPC ........ G06F 3/1454; G06F 3/012; G06F 3/013; G06K 9/00302; A63F 13/212; A63F 13/5255; A63F 13/213; A63F 13/211; A63F 13/26; G02B 27/017; G02B 2027/0187; G02B 2027/014; G02B 2027/0138
See application file for complete search history.

(56) References Cited

U.S. PATENT DOCUMENTS

2015/0253573 A1* 9/2015 Sako .................. G02B 27/0172
345/156

* cited by examiner

*Primary Examiner* — Adam R. Giesy
(74) *Attorney, Agent, or Firm* — Penilla IP, APC

(57) ABSTRACT

Method for providing image of HMD user to a non-HMD user includes, receiving a first image of a user including the user's facial features captured by an external camera when the user is not wearing a head mounted display (HMD). A second image capturing a portion of the facial features of the user when the user is wearing the HMD is received. An image overlay data is generated by mapping contours of facial features captured in the second image with contours of corresponding facial features captured in the first image. The image overlay data is forwarded to the HMD for rendering on a second display screen that is mounted on a front face of the HMD.

13 Claims, 11 Drawing Sheets

(surprise emotion)

(sadness emotion)

(anger emotion)

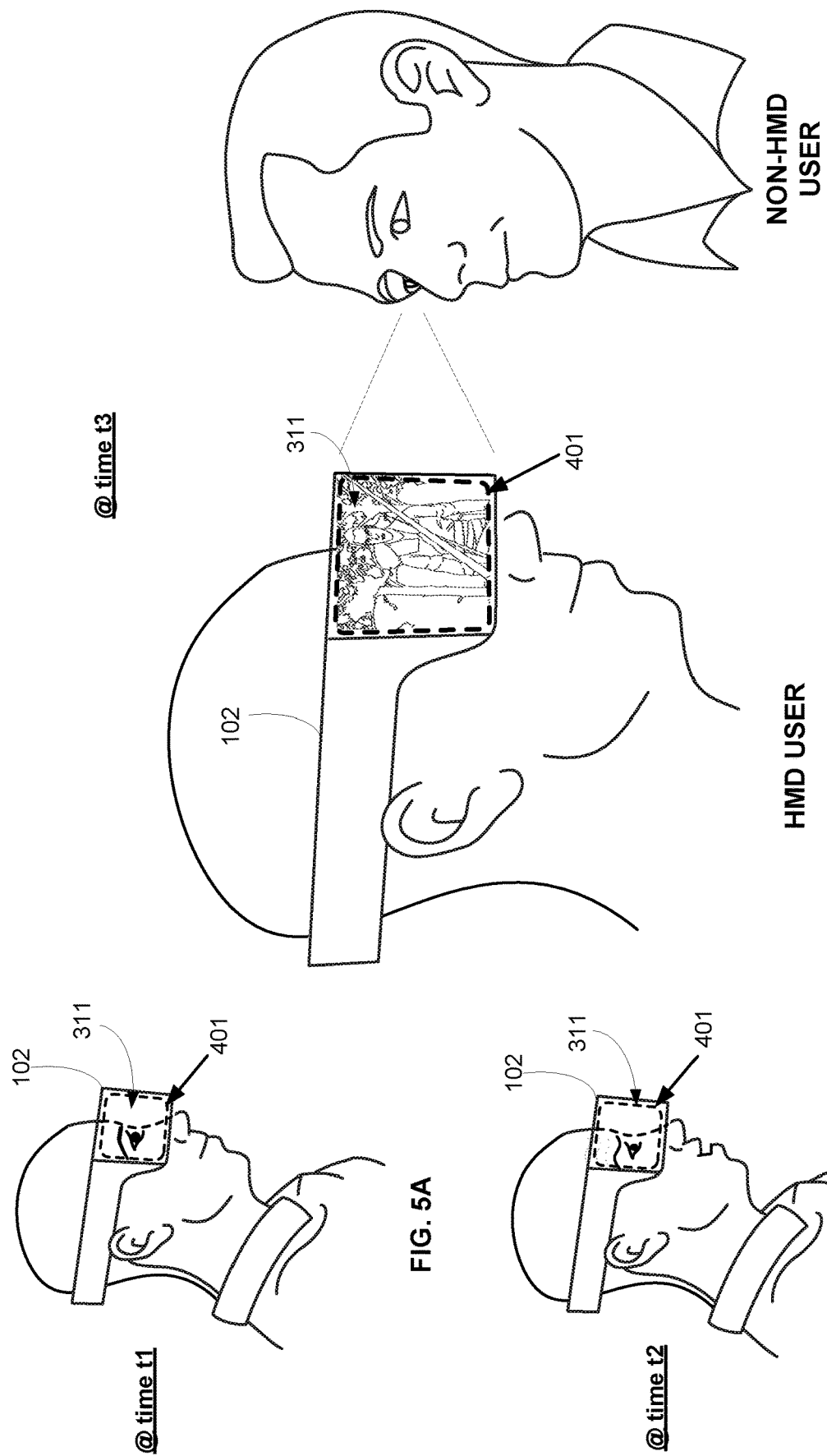

DISPLAY SCREEN FRONT PANEL OF HMD FOR VIEWING BY USERS VIEWING THE HMD PLAYER

CLAIM OF PRIORITY

This application is a continuation of and claims priority to U.S. patent application Ser. No. 15/631,212, filed on Jun. 23, 2017, and entitled, "Display Screen Front Panel of HMD for Viewing by Users Viewing the HMD Player," which claims priority to U.S. Provisional Patent Application No. 62/357,348, filed on Jun. 30, 2016, and entitled, "Display Screen Front Panel of HMD for Viewing by Users Viewing the HMD Player," which are incorporated herein by reference in their entirety.

BACKGROUND

1. Field of the Invention

The present invention relates to methods and systems for providing a view of a user's changing expressions while interacting with content on a head-mounted display.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Various gaming platforms are sold in the form of game consoles. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console.

Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide methods and systems for providing a visual of content that a user is viewing on a head mounted display to other users. It should be appreciated that the present invention can be implemented in numerous ways, such as a process, an apparatus, a system, a device or a method on a computer readable medium. Several inventive embodiments of the present invention are described below.

In one embodiment, a method is provided. The method includes: receiving a first image of a user including facial features of the user as captured by an external camera when the user is not wearing a head mounted display (HMD); receiving a second image capturing a portion of the facial features of the user when the user is wearing the HMD, the portion of the facial features captured includes a current expression of the user as captured by an inward facing camera; generating an image overlay data by mapping contours of facial features captured in the second image with contours of corresponding facial features captured in the first image; and forwarding the image overlay data for rendering on a second display screen that is mounted on a front face of the HMD.

In another embodiment a head mounted display (HMD) device is provided. The HMD device includes a lens of optics for viewing content; a first display screen disposed behind the lens of optics such that the lens of optics is between the display screen and an eye of a user, when the HMD device is worn by the user; an inward facing camera mounted on an inside of the HMD and directed toward the eye of the user, the inward facing camera configured to capture an image of a portion of facial features of the user that is behind the HMD; an electronic circuitry to communicate the image to a computer communicatively coupled to the HMD; and a second display screen disposed on a front face of the HMD device and facing forward, the second display screen is configured to render the image capturing one or more facial features of the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 5A-5D illustrate example views of content that is rendered for the non-HMD users when the non-HMD users are observing the HMD users, in accordance to one embodiment of the invention.

DETAILED DESCRIPTION

The following embodiments describe methods and apparatus for providing a visual of a game scene of a video game that a user of a head mounted display is viewing to other viewers who are facing the user of the head mounted display.

It will be obvious, however, to one skilled in the art, that the present invention may be practiced without some or all of these specific details. In other instances, well known process operations have not been described in detail in order not to unnecessarily obscure the present invention.

Figure 1:
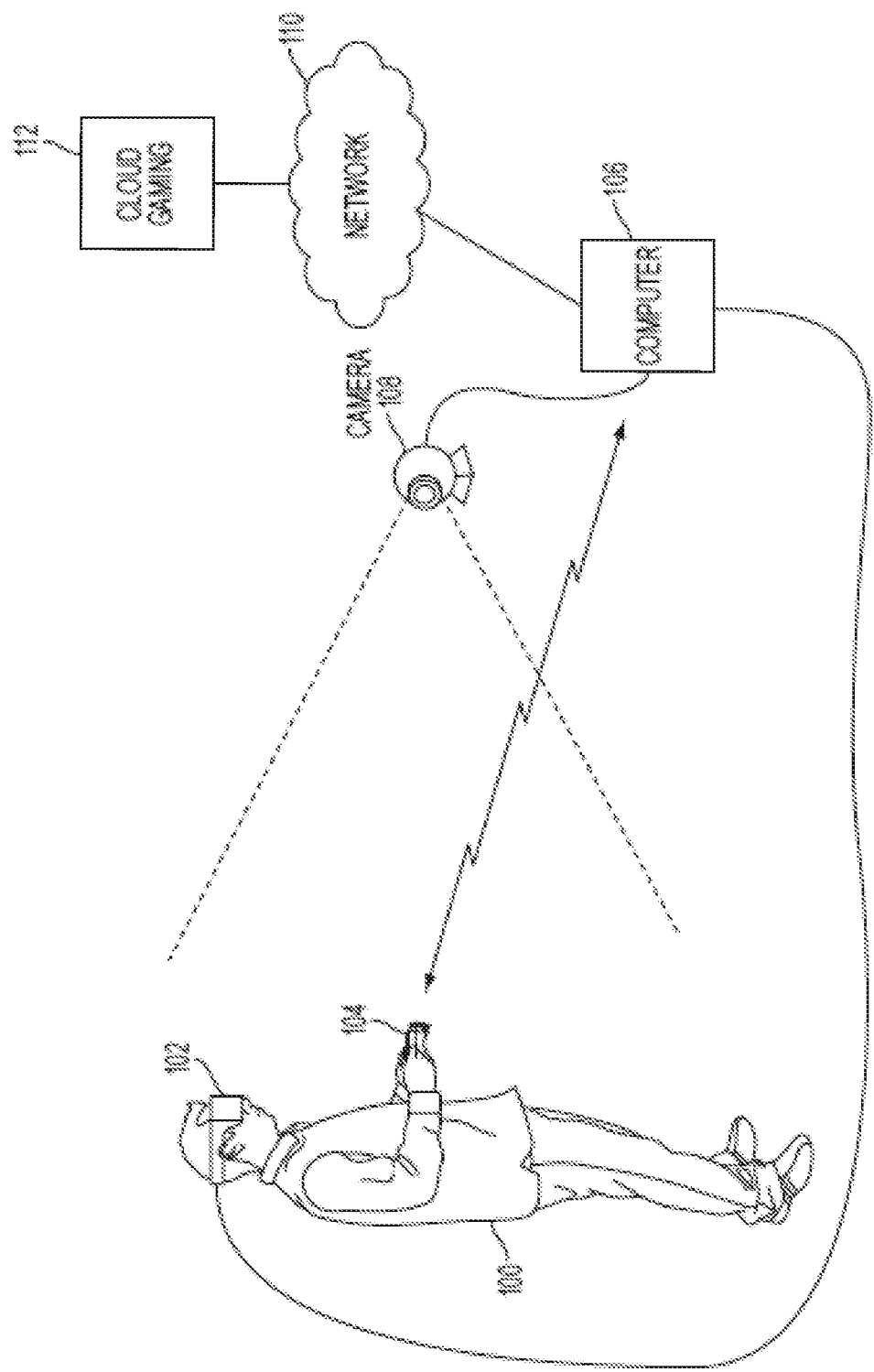
FIG. 1 illustrates a system for interactive gameplay of a video game, in accordance with an embodiment of the invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user. In some embodiments, the HMD 102 provides a very immersive experience by blocking a view of a real-world environment.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. The computer 106 is not restricted to executing a video game but may also be configured to execute an interactive application, which outputs content for rendering by the HMD 102.

The user 100 may operate a controller 104 to provide input for the video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light or other marker elements which can be tracked to determine its location and orientation. Additionally, as described in further detail below, the HMD 102 may include one or more lights or marker elements, which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the video game, while the remaining portion of the video game may be executed on a cloud gaming provider 112. For example, a request for downloading the video game from the computer 106 may be serviced by the cloud gaming provider 112. While the request is being serviced, the cloud gaming provider 112 may execute a portion of the video game and provide game content to the computer 106 for rendering on the HMD 102. The computer 106 may communicate with the cloud gaming provider 112 over a network 110. Inputs received from the HMD 102, the controller 104 and the camera 108, are transmitted to the cloud gaming provider 112, while the video game is downloading on to the computer 106. The cloud gaming provider 112 processes the inputs to affect the game state of the executing video game. The output from the executing video game, such as video data, audio data, and haptic feedback data, is transmitted to the computer 106 for onward transmission to the respective devices.

Once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108. In such embodiments, a game state of the video game at the computer 106 is synchronized with the game state at the cloud gaming provider 112. The synchronization may be done periodically to keep the state of the video game current at both the computer 106 and the cloud gaming provider 112. The computer 106 may directly transmit the output data to the relevant devices. For example, video and audio streams are provided to the HMD 102, whereas the haptic feedback data is used to generate a vibration feedback command, which is provided to the controller 104.

Figure 2:
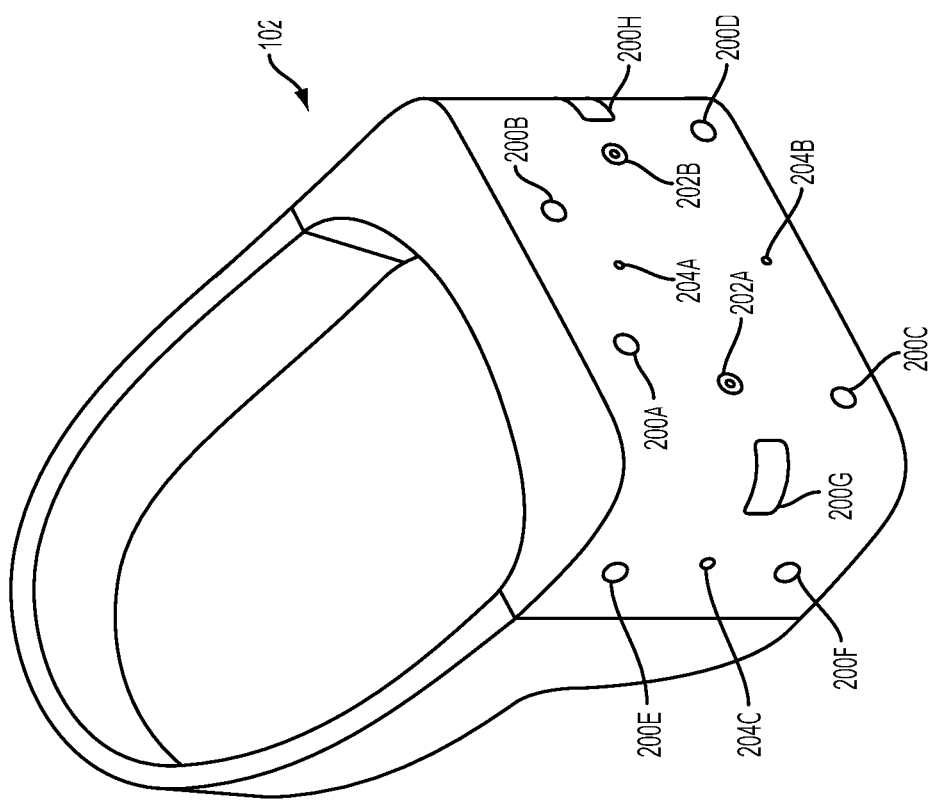
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
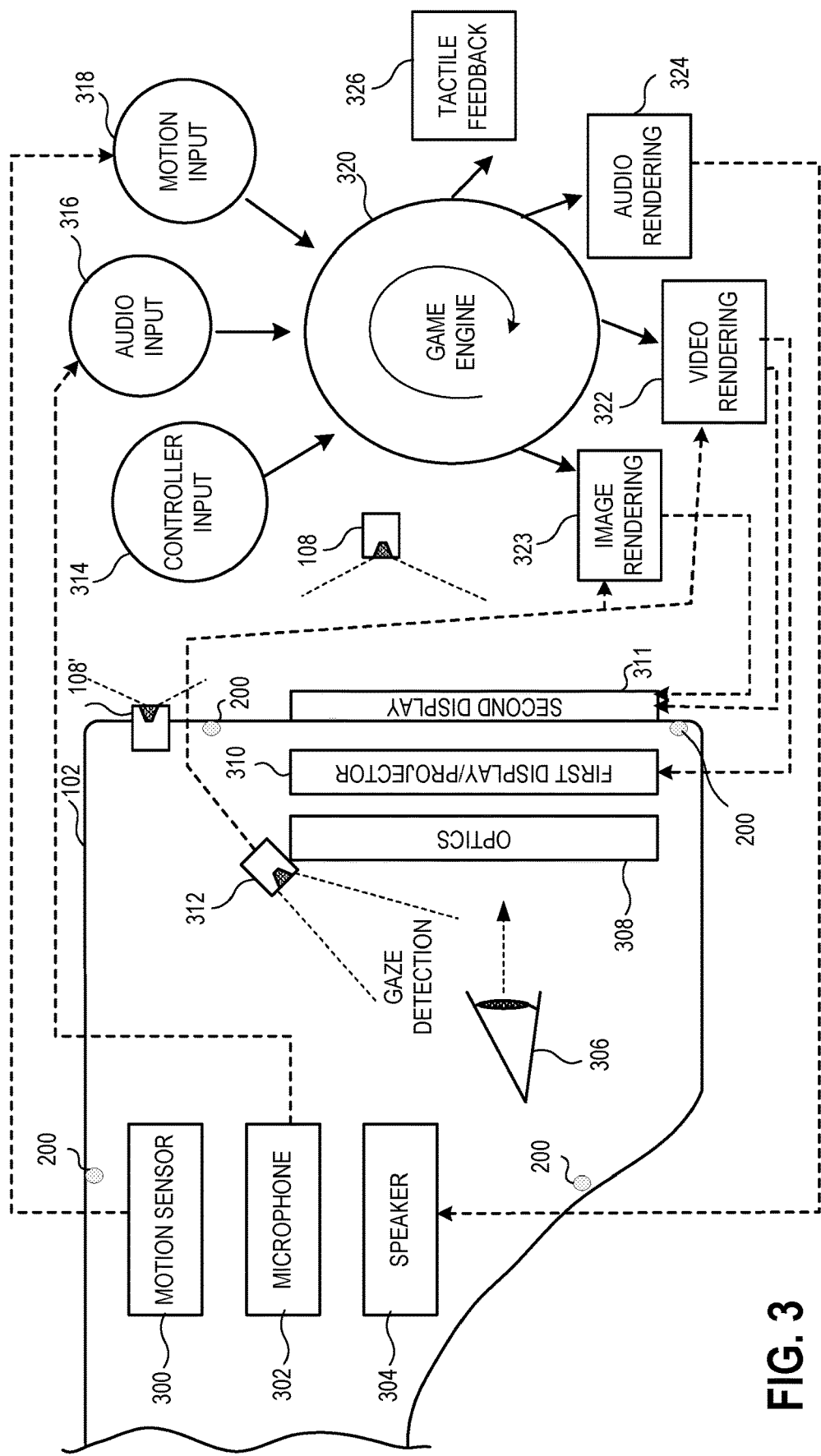
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the disclosure. In some implementation, the video game is being executed on a computer 400 that is communicatively coupled to the HMD 102. The computer may be local to the HMD (e.g., part of local area network) or may be remotely located (e.g., part of a wide area network, a cloud network, etc.) and accessed via a network. The communication between the HMD 102 and the computer 400 may follow a wired or a wireless connection protocol. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a hand-held gaming controller 104 (e.g. Sony DUALSHOCK®4 wireless controller, Sony PlayStation® Move motion controller) or wearable controllers, such as wearable glove interface controller, etc. By way of example, controller input 314 may include directional inputs, button presses, trigger activation, movements, gestures or other kinds of inputs processed from the operation of a gaming controller. The audio input 316 can be processed from a microphone 302 of the HMD 102, or from a microphone included in the image capture device 108 or elsewhere within the local system environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a first display/projector mechanism 310, and viewed through optics 308 by the eye 306 of the user. A second display screen 311 is disposed on the outside of a front face of the HMD 102. The second display screen 311 is configured to receive image or video data from an image rendering module 323 or video rendering module 322 for rendering. The image or video data transmitted by the image rendering module 323 or the video rendering module 322 includes a portion of the facial features of a user captured while the user was interacting with content rendered on a display screen of the HMD.

An audio rendering module 324 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio. In some embodiments, additional microphone 302 can be added and associated with the second display that is presenting content to an external viewer. In this embodiment, the speaker 304 is associated with the first display of the HMD.

In one embodiment, a gaze tracking camera 312 is included in the HMD 102 to enable tracking of the gaze of the user. Although only one gaze tracking camera 312 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

A HMD user may elect to interact with the interactive content, such as video game content, by wearing the HMD and selecting a video game for game play. Interactive virtual reality (VR) scenes from the video game are rendered on a display screen of the HMD. The HMD allows the user to completely immerse in the game play by provisioning display mechanism of the HMD in close proximity to the user's eyes. The display regions defined in the display screen of the HMD for rendering content occupy large portions or even the entirety of the field of view of the user.

When a first user adorns the HMD, a portion of the first user's face is hidden behind the HMD. A second user (i.e., a non-HMD user or a second user wearing a HMD with a front facing external camera or a second HMD-user with the help of the external camera 108) watching the first user (i.e., HMD user) interacting with the video game is unable to gauge the first user's expression or to determine the gaze direction of the first user or if the first user is feeling dizzy or sick during game play, as the first user's expressions are masked by the HMD. The second user is only able to watch a portion of the first user's face that is not covered by the HMD. Further, the second user does not have the ability to see what content the first user is watching or interacting with unless the content watched by the first user is displayed on the second display 311 or presented electronically at the first display of the HMD worn by the second user.

As used herein, a first user (or simply "a user") is a HMD user that is viewing or interacting with some content presented on the HMD. A non-HMD user is any other user that is observing the HMD user. The non-HMD user may be a spectating user if the non-HMD user follows the game play of the HMD user. Although the non-HMD user means a user that is not wearing the HMD, the non-HMD user may be another user wearing an HMD. As such, when a user is referenced herein, the reference is to the user wearing the HMD and interacting with the content rendered on the HMD (i.e., the HMD user) and the non-HMD user is any other user that is viewing the HMD user.

Implementations of the current disclosure provide ways to allow a non-HMD user to observe a HMD user's expression, while the HMD user is interacting with content rendering on the HMD, without requiring the HMD user to remove the HMD. The content that is being rendered on the HMD may be interactive game content, interactive application content, content provided by a content provider or other user, or may be generated by the HMD user.

In one implementation, the user's emotions expressed via the user's eyes, portion of the nose, and other facial features that are hidden behind the HMD, are captured as images by the gaze tracking camera 312 and forwarded to an image rendering module 323 for further processing. In another implementation, the user's emotions and other facial features are captured as video by the gaze tracking camera 312 and forwarded to a video rendering module 322. In both of the implementations, the gaze tracking camera 312 is not only used to track the gaze direction of the user but also to detect the HMD user's emotions expressed in the eyes and other facial features that are behind the HMD. In alternate implementations, one or more inward facing cameras (not shown) may be employed, in addition to the gaze tracking camera 312, to capture additional images or videos of the user's expressions including changes to the user's expressions expressed via one or more facial features (e.g., user's eyes, nose, etc.) that are behind the HMD.

In some implementations, the image rendering module 323 and/or the video rendering module 322 receives the image or video of a portion of the user's facial features that are behind the HMD from one or more image or video capturing devices, such as gaze tracking camera 312, other inward facing cameras, etc., and performs image and/or video analysis of the image. As part of analyzing the image/video, for example, captured by the image capturing device(s), the image rendering module 323 and/or the video rendering module 322 may retrieve an image of the user's full facial features captured by camera 108 at a time when the user was not wearing the HMD. The full facial image of the user may have been previously captured and stored in either a user profile of the user or in cache memory, and retrieved every time the user wears the HMD to interact with content presented on the HMD.

The image rendering module 323, for example, performs image analysis of the full facial image and the partial facial image captured by the different cameras to identify contours and other feature characteristics contained therein. The image rendering module 323 then uses this analysis to carefully map the portion of the facial features captured by the image capturing device(s) and to generate image overlay data. Similar analysis may be done by the video rendering module 322 to generate the image overlay data. The image overlay data is then forwarded to the second display screen for overlaying on the existing facial features.

To begin with, the portion of the facial features rendered on the second display screen may be from the full facial feature image of the user captured by the camera 108 or retrieved from a user profile, for example. As the user begins to interact with the content and the user's expressions change, such changes are detected and captured by the image capturing camera(s), and an image overlay data reflecting the changes in the portion of the facial features that are behind the HMD, is dynamically generated in real-time and provided to the second display screen for rendering.

In some implementations, more than one camera 108 may be used to capture the full facial feature of the user. In such implementations, the images captured by the different cameras 108 identifying different views, may be processed to define a three-dimensional image (with depth, etc.). In some implementations, the three-dimensional image data may be used to construct a two-dimensional image and the image from an image capturing device of the HMD 102, such as a camera that is directed inward toward the face of the user, capturing a portion of the facial feature may be processed by matching the facial feature contours captured in the portion to corresponding facial feature contours of the two-dimensional image of the full facial feature of the user.

In some implementations, the images captured by the different cameras (gaze detection camera 312, inward facing camera(s) and the camera 108) are used to generate a three-dimensional image of the user's face and the images captured by the gaze detection camera 312 and/or inward facing camera(s) are processed to generate a three-dimensional image overlay data. The three-dimensional image overlay data of the portion of the facial features behind the HMD, is generated by matching the facial feature contours of the corresponding three-dimensional images representing the portion and the full facial features of the user.

In one implementation, as part of constructing the image overlay data, the image rendering module 323 compares the portion of the facial features captured by the image capturing device(s) with the portion of the facial features captured by the external camera 108 to determine if there are any changes. When a change is detected in the portion of the facial features of the HMD user, the image rendering module 323 constructs the overlay data by capturing the changes and forwards the image overlay data to the second display screen 311 for rendering. The rendering includes superimposing the image overlay data over the existing image of the portion of the facial features of the user that is rendered on the second display screen 311, by matching the contours of the features captured in the two different images (image captured by the external camera 108 and the image overlay data). Similar technique may be used by the video rendering module 322 to match the contours of the features captured in the video images in order to construct the video overlay data for rendering at the second display screen 311. The portion of the facial features rendered on the second display screen 311 completes the user's full facial feature and reflects the user's current expressions. The rendered image is visible to the non-HMD users as the second display screen 311 is facing forward and is disposed on the front face of the HMD. The superimposition allows the non-HMD user to observe the HMD user's current expressions, as though the HMD user is not wearing the HMD. The capturing, processing and provisioning of the image for the portion of the user's facial features that are behind the HMD, are done in substantial real-time while the HMD user continues to view or interact with the content that is currently rendering on the first display 310. The non-HMD users may observe the changing expressions as it is being provided by the HMD user, without the HMD user having to remove his HMD. In some implementation, the non-HMD users may track the expressions of the HMD user to determine if the HMD user is feeling dizzy or is getting tired and warn the HMD user, so that the HMD user may stop interacting with the content or take necessary steps to slowly disassociate with the content. For example, the HMD user may be completely immersed in a high-intensity video game that is rendering the content on the first display screen and may not even be aware of that he is getting tired or dizzy (e.g., a child using the HMD). The non-HMD user may be able to observe the current expressions of the HMD user and provide the necessary warning to the HMD user or take corrective actions to prevent the HMD user from harming himself.

In some implementations, instead of or in addition to allowing a non-HMD user to observe the HMD user's expression, the non-HMD user may be able to view the same content that the HMD user is watching or interacting with, without requiring the content to be rendered on an external display screen. In such implementations, the content that is rendered on the first display 310 may also be forwarded to the second display screen 311.

In some implementations, the non-HMD user may be able to view the HMD user's changing expressions during the time the HMD user is viewing/interacting with content rendering on the first display screen 310 for a period of time and then switch to viewing the HMD user's interaction with the content currently rendering on the first display screen 310 for a second period of time before switching back to the viewing the HMD user's expressions. In such implementations, the content provided to the second display screen 311 may be switched between images of the changing expressions of the HMD user and the images of the VR scene content. The switching in the content rendered on the second display screen 311 may be time-based or defined by the HMD user. The respective content (image of the user or images of the VR scene content) may be viewed by the non-HMD user without requiring the content to be displayed on a display screen that is outside of the HMD and without requiring the HMD user to remove his HMD.

Figure 4B:
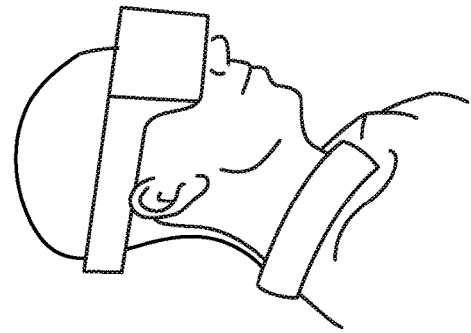
FIGS. 4A-4C illustrates a HMD user as viewed by a non-HMD user before and after implementing the disclosure.
Figure 4C:
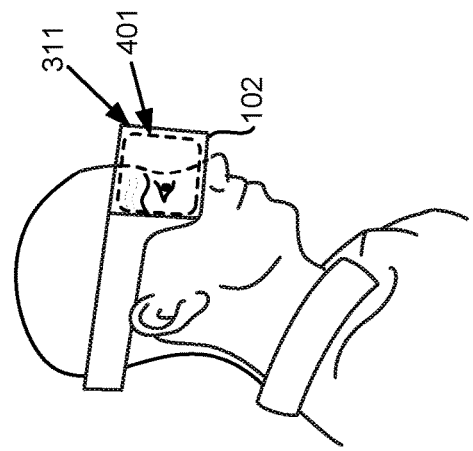
Figure 4A:

FIGS. 4A-4C illustrate images of a HMD user as viewed by a non-HMD user before and after implementation of an embodiment of the disclosure. FIG. 4A illustrates an image of the HMD user when the user is not wearing the HMD. This image may be part of his user profile and may have been captured by an external camera that is outside of the HMD. Alternately, this image may be provided by the user. FIG. 4B illustrates an image of a user wearing the HMD, as perceived by a non-HMD user before implementation of the current disclosure. The image of the user shows only a portion of facial features, which excludes the eyes, portion of the nose and cheek that are behind the HMD. As a result, the non-HMD user can not view the user's emotions that are expressed using the facial features that are hidden behind the HMD.

FIG. 4C illustrates an image of the HMD user with all of his facial features being rendered using the disclosure described in the various embodiments. The eyes, portions of the nose and cheek that were behind the HMD are now rendered on a second display screen 311 of the HMD, thereby providing a complete view of the HMD user's facial features to a non-HMD user.

Figure 4F:
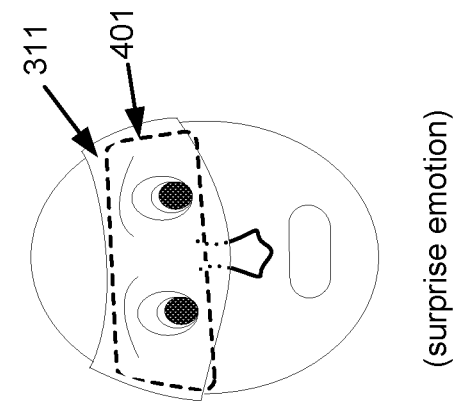
FIGS. 4D-4F illustrate various emotions of the HMD user that is rendered on a second display screen of the HMD for non-HMD users to view, in accordance with an embodiment of the invention.
Figure 4E:
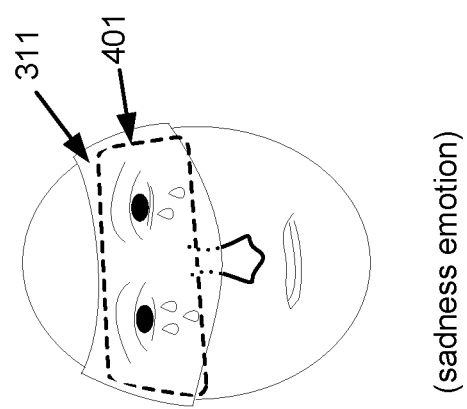
Figure 4D:
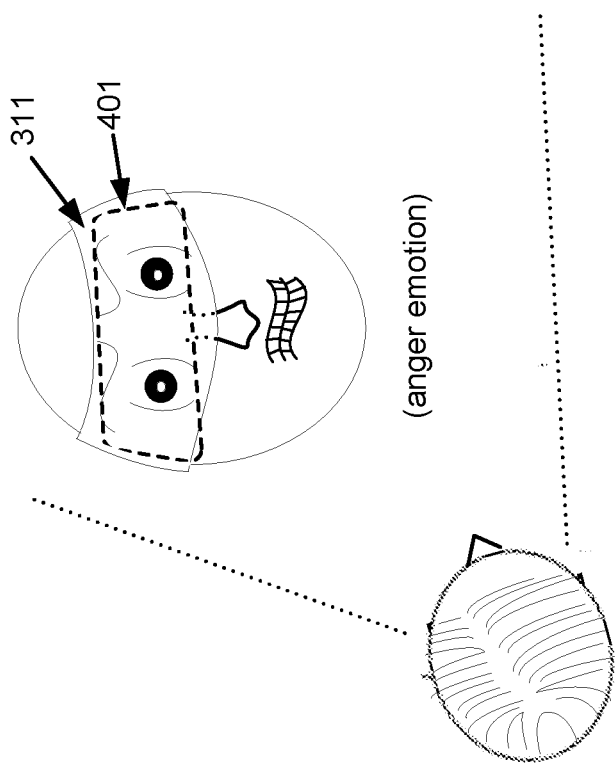

When one or more facial features change, such changes reflecting different emotions of the HMD user are rendered on the second display screen 311, as illustrated in FIGS. 4D-4F. For example, the emotion expressed by the HMD user has changed from plain emotion to an anger emotion and this change is reflected in the image rendered on the second display screen 311. FIG. 4E illustrates another example emotion, a sadness emotion, captured by the inward facing camera and rendered on the second display screen 311 and FIG. 4F illustrates an image of the HMD user showing a surprise emotion. Each of the different emotions are detected by the inward facing camera or gaze detection camera and is provided for rendering the second display screen 311, so that the non-HMD user watching the HMD user can see the change in expression defining the different emotions that the HMD user goes through while interacting or viewing content on the first display screen of the HMD.

Figure 5D:
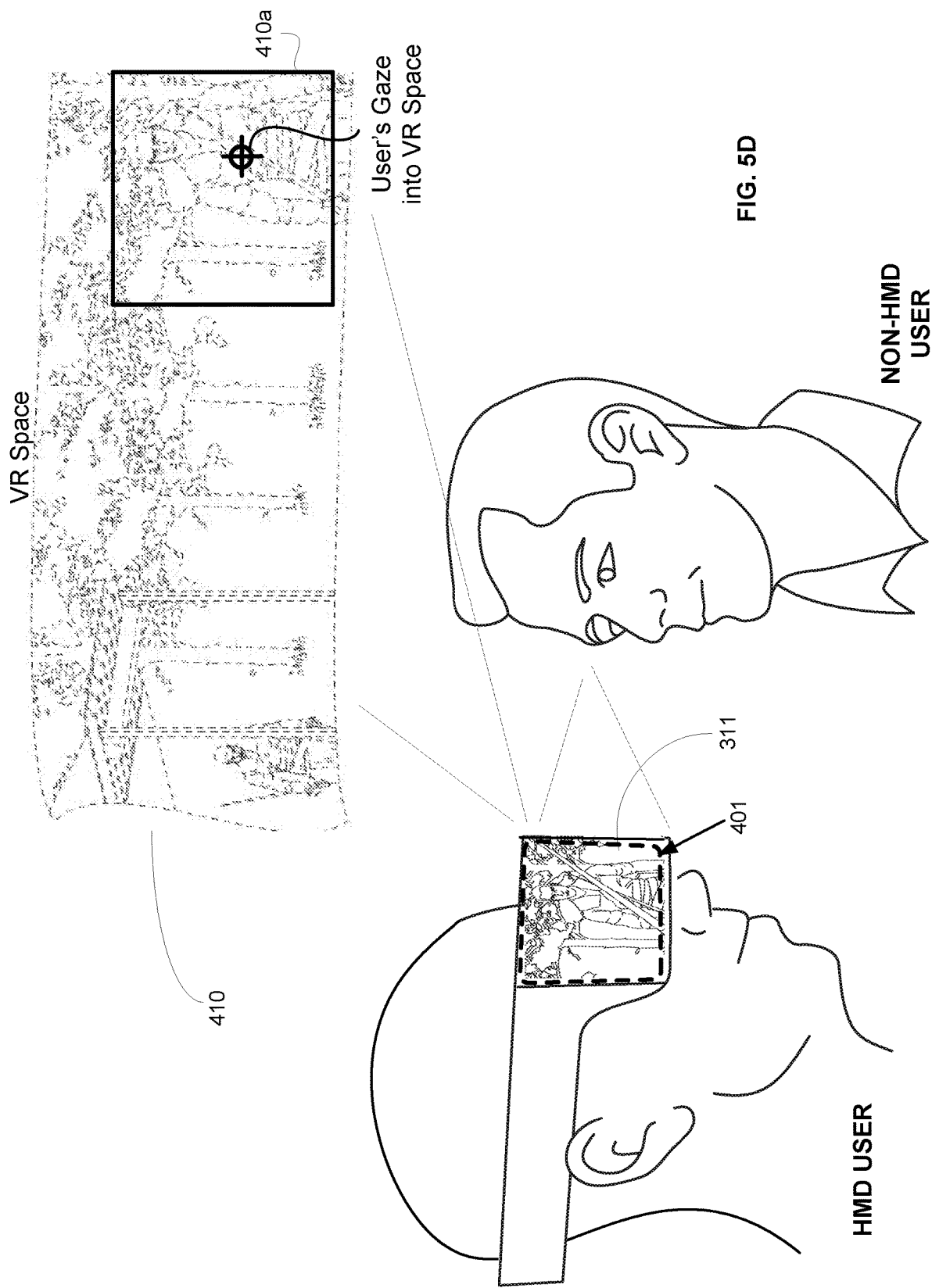

FIGS. 5A-5D illustrate another example of content that is rendered on a second display screen for a non-HMD user to see while observing a HMD user, in one implementation. The second display screen 311 may be used to render the facial expressions captured by the inward facing camera or images from a virtual reality (VR) space, such as VR scenes from a video game rendering on the first display screen 310 of the HMD 102. In FIG. 5A, the second display screen 311 shows the HMD user's expression at time t1. As the HMD user continues to interact with content that is being rendered on the first display screen, the HMD user's expression may change and such expressions are captured and rendered on the second display screen 311. FIG. 5B illustrates one such expression of the HMD user that was captured at time t2 and rendered on the second display screen 311. At time t3, the second display screen 311 may transition from rendering images capturing the HMD user's expressions to rendering scenes from a VR space (i.e., content that is being rendered in the first display screen 310). FIG. 5C illustrates an example VR scene that is currently rendering on the first display screen 310 is also being rendered on the second display screen 311 so as to allow the non-HMD user to view the content that the HMD user is viewing or interacting with using the HMD. In some implementations, the switching of content rendered on the second display screen 311 is in response to a signal detected at the HMD. The signal may be a switch signal requiring the first image and the image overlay data currently rendering on the second display screen 311 to be switched out and the content of the VR scene that is currently rendering on the first display screen 310 to be rendered on the second display screen 311. In some implementation, the signal may be generated by the HMD user or by another user (i.e., another HMD user or a non-HMD user) who is observing the HMD user. In other implementations, the signal may be time-based and generated at the HMD or at the computing device that is communicatively connected to the HMD.

In some implementations, the switching of content rendered on the second display screen 311 may last for a pre-defined period of time before the content rendered on the second display screen 311 is switched back to rendering the first image and the image overlay data of the user wearing the HMD. In alternate implementations, the content of the VR scene will continue to render till a second signal is received at the HMD to switch the content rendering on the second display screen.

In some implementation, the signal detected at the HMD may be a request for rendering the content on the second display screen 311, in addition to rendering the facial features of the HMD user. In response to detecting the signal, the second display screen 311 may be split into two portions. A first portion of the second display screen 311 is used to render the content from the VR scene by switching out a portion of the first image data and the image overlay data corresponding to the first portion and begin rendering the content from the VR scene in the first portion. A second portion of the second display screen 311 may continue to render the remaining portion of the first image and the image overlay data of the HMD user. In alternate implementations, the different content rendered in the first portion and the second portion may be scaled to fit within the respective portions.

In some implementations, the switching out of the first portion of the second display screen may last for a pre-defined period of time and upon expiration of the pre-defined period of time, the content from the VR scene is switched out and the corresponding portion of the first image and the image overlay data is rendered in the first portion of the second display screen 311. In alternate implementations, the content of the VR scene will continue to render in the first portion till a second signal is received at the HMD to switch the content rendering in the first portion of the second display screen.

FIG. 5D illustrates an expanded view of a VR scene that is rendered on the second display screen 311. As mentioned earlier, the VR scene content may be rendered on the entire second display screen 311 or in a portion of the second display screen 311. The HMD user is provided with a wider view of the VR scene 410 defined in the VR space as the display mechanisms provided in the HMD allow the HMD user to have a broader field of view. Of course, due to a limited size of the second display screen 311, only a portion 410a of the VR scene 410 viewed by the HMD user may be presented for rendering on second display screen 311, in some implementations. FIG. 5D illustrates one such implementation, wherein a portion 410a of the VR scene that is rendered on the second display screen 311 corresponds to the HMD user's gaze, while the HMD user is presented with a much broader view of the VR space 410. In some other implementations, the VR space 410 that is presented in the first display screen 310 may be scaled down to a size of the second display screen 311 and rendered at the second display screen 311.

Figure 6A:
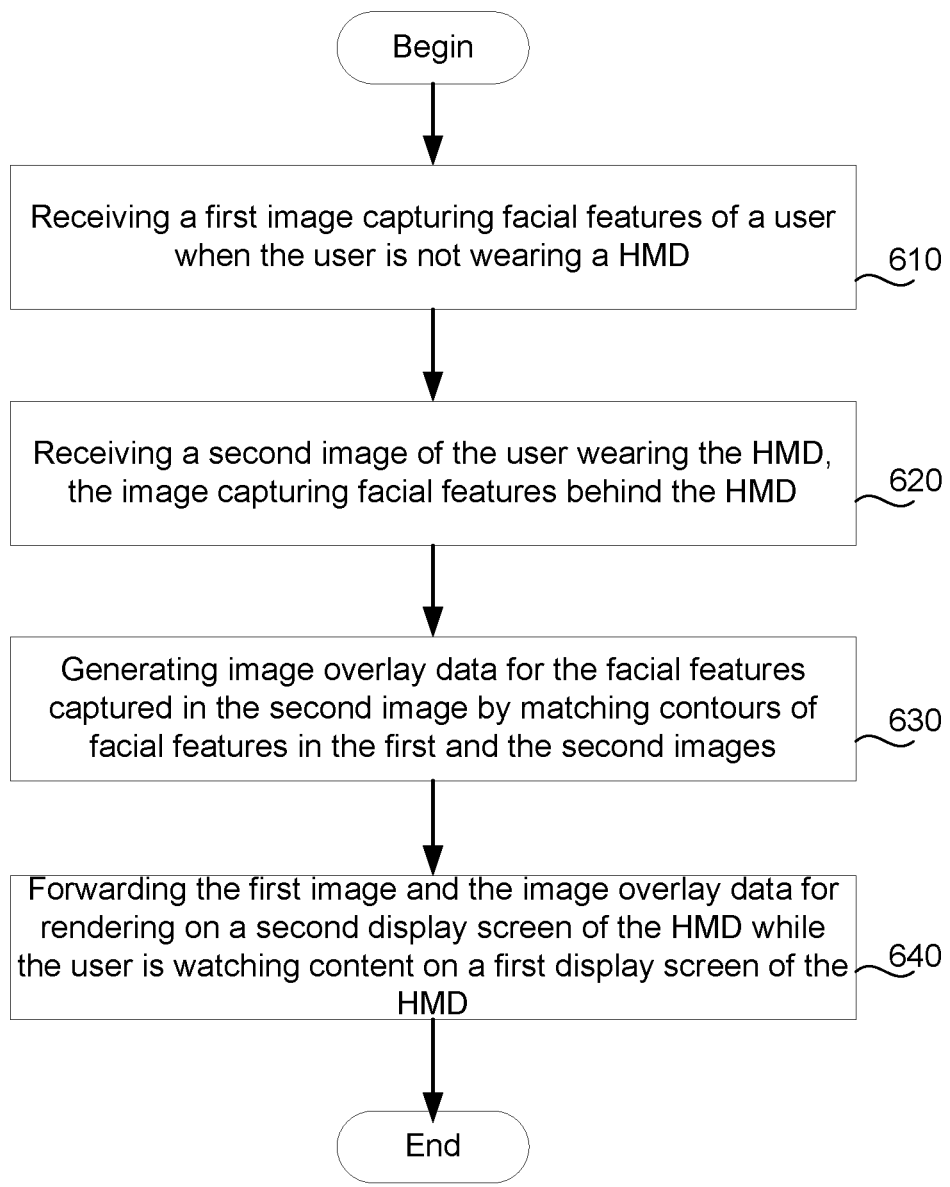
FIG. 6A illustrates operation flow of a method that is used for presenting the expressions of a HMD user to a non-HMD user, while the HMD user is interacting with content, in one embodiment of the invention.

FIG. 6A illustrates an operation flow of a method, in one embodiment. The method begins at operation 610, wherein a first image of a user is received. The first image captures facial features of the user when the user is not wearing a HMD. The first image may be obtained at a time the user is ready to operate the HMD or may be retrieved from an image that was taken earlier and stored in the user profile.

A second image of the user wearing the HMD is received, as illustrated in operation 620. The second image captures the facial features of the user that are behind the HMD and are taken by a gaze detection camera that is mounted inside the HMD and directed toward a user's eye. An image overlay data is generated for the facial features captured in the second image, as illustrated in operation 630. The image overlay data is generated by matching contours of the facial features of the user captured in the first image with the contours of the corresponding facial features captured in the second image. The image overlay data is forwarded to the second display screen of the HMD for rendering, as illustrated in operation 640. The image overlay data is captured and rendered while the user is watching content on a first display screen of the HMD.

Figure 6B:
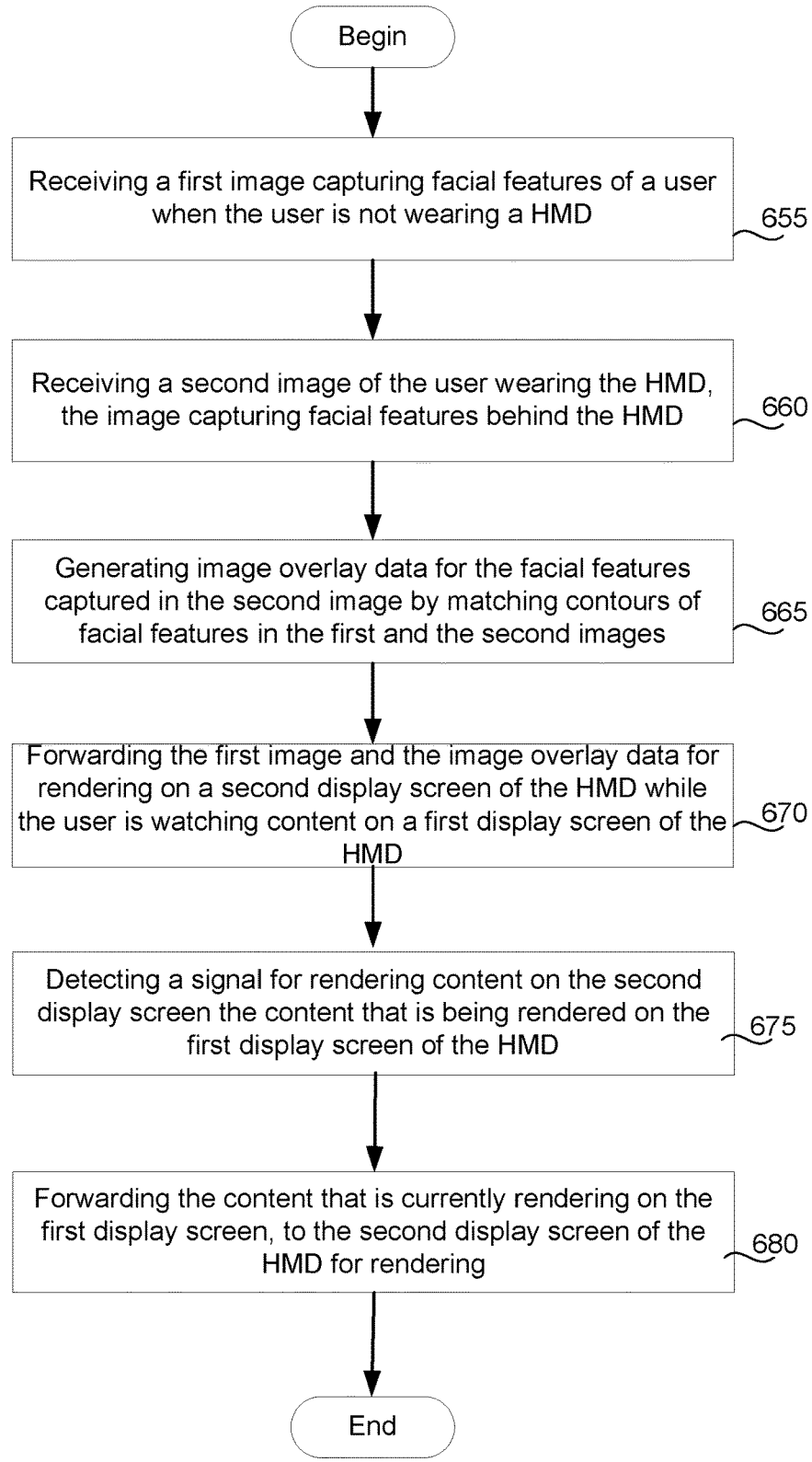
FIG. 6B illustrates operation flow of a method that is used for presenting the expressions of a HMD user to a non-HMD user, while the HMD user is interacting with content, in an alternate embodiment of the invention.

FIG. 6B illustrates operation flow of a method, in an alternate embodiment than the one discussed with reference to FIG. 6A. The method begins at operation 655, wherein a first image of a user is received. The first image captures facial features of the user when the user is not wearing a HMD. The first image may be obtained at a time the user is ready to operate the HMD or may be retrieved from an image that was taken earlier and stored in the user profile.

A second image of the user wearing the HMD is received, as illustrated in operation 660. The second image captures the facial features of the user that are behind the HMD and are taken by an image capturing device that is mounted inside the HMD and directed toward the user. The second image captures the current expression of the user and is used to generate an image overlay data, as illustrated in operation 665. The image overlay data is generated by matching contours of the facial features of the user captured in the first image with the contours of the corresponding facial features captured in the second image. The image overlay data is forwarded to the second display screen of the HMD for rendering, as illustrated in operation 670. The image overlay data is captured and forwarded for rendering while the HMD user is watching content on a first display screen of the HMD. The image overlay data is used to update a corresponding portion of the facial features captured in the first image that is currently rendering on the second display screen.

A signal for rendering the content that is being rendered in the first display screen, is detected at the second display screen, as illustrated in operation 675. The signal may be generated by a user (either the HMD user or a non-HMD user) or may be time-based. Further, the signal may be a request to switch out the image of the HMD user with the content or may be a request to render the content of the VR scene on the second display screen in addition to the image of the HMD user.

In response to the signal, the content from the VR scene that is being sent to the first display screen is also sent to the second display screen for rendering, as illustrated in operation 680. Based on the signal, the content from the VR scene is rendered by switching out the image of the HMD user or may be rendered in a portion of the second display screen 311 while the remaining portion of the second display screen 311 continues to render the image of the user.

The various embodiments described herein allow a non-HMD user to view the expressions of a HMD user while the HMD user is watching or interacting with content rendered on a first display screen of the HMD. This allows the non-HMD users to view the HMD user's expressions without requiring the HMD user to remove the HMD. Additionally, the various embodiments allow non-HMD users to view the content that is being rendered on the first screen without requiring the content to be rendered on an external display screen of a second device. Rendering the content on a display screen of a second device would require identifying and pairing of the second device with the HMD and the computer. The various embodiments allow other users (HMD users or non-HMD users) to view the content the HMD user is viewing without requiring pairing of additional devices. Other advantages will become apparent to one skilled in the art.

Various embodiments described herein have been described with reference to video games presented on a head-mounted display device. However, it will be appreciated that in accordance with other embodiments, the principles and methods thus described may also be applied in the context of other types of interactive applications, and in the context of presentation on other types of devices, including but not limited to televisions and other types of displays on which interactive applications may be presented.

Figure 7:
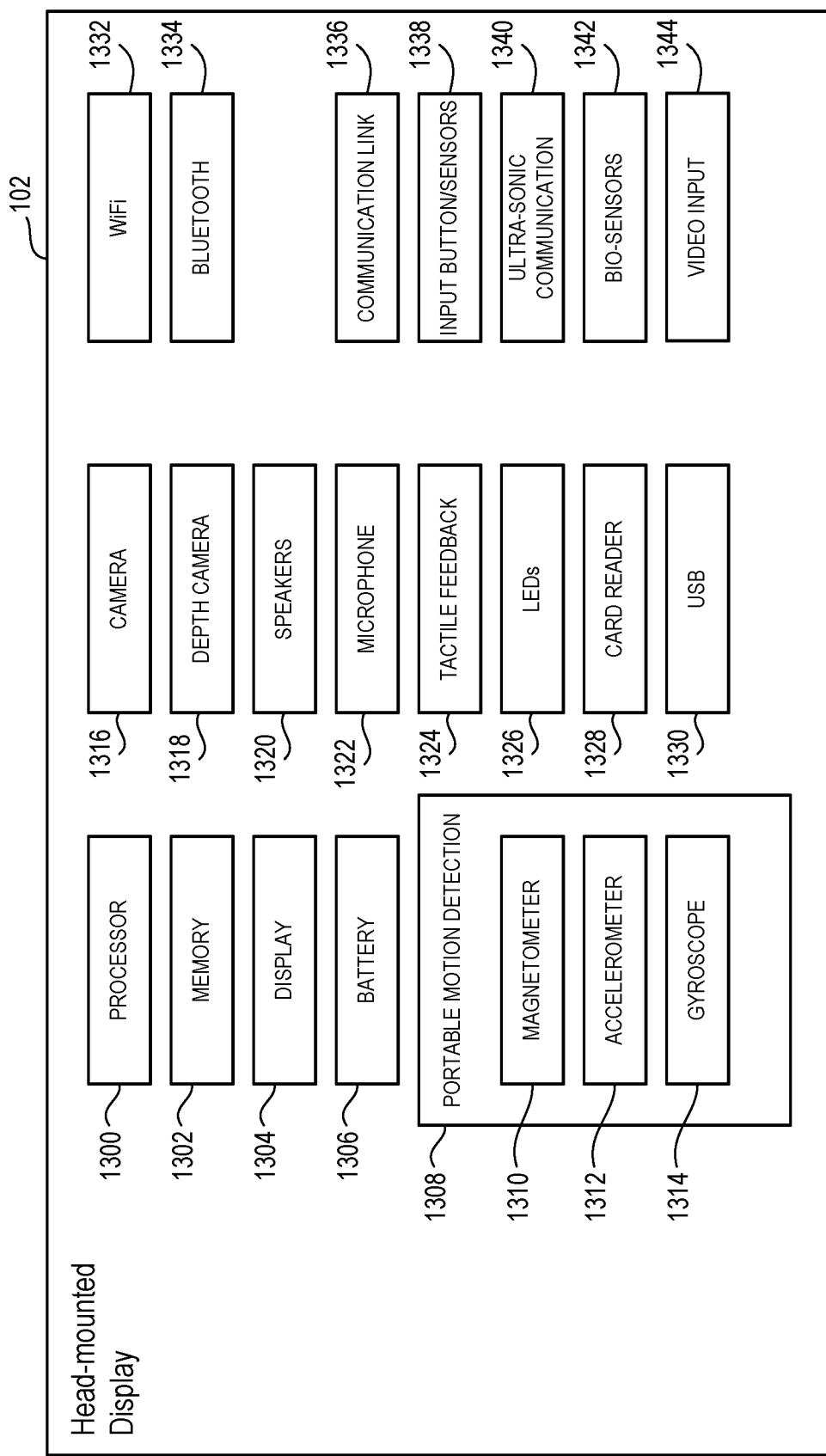
FIG. 7 illustrates components of a head-mounted display, in accordance with an embodiment of the invention.

With reference to FIG. 7, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 8:
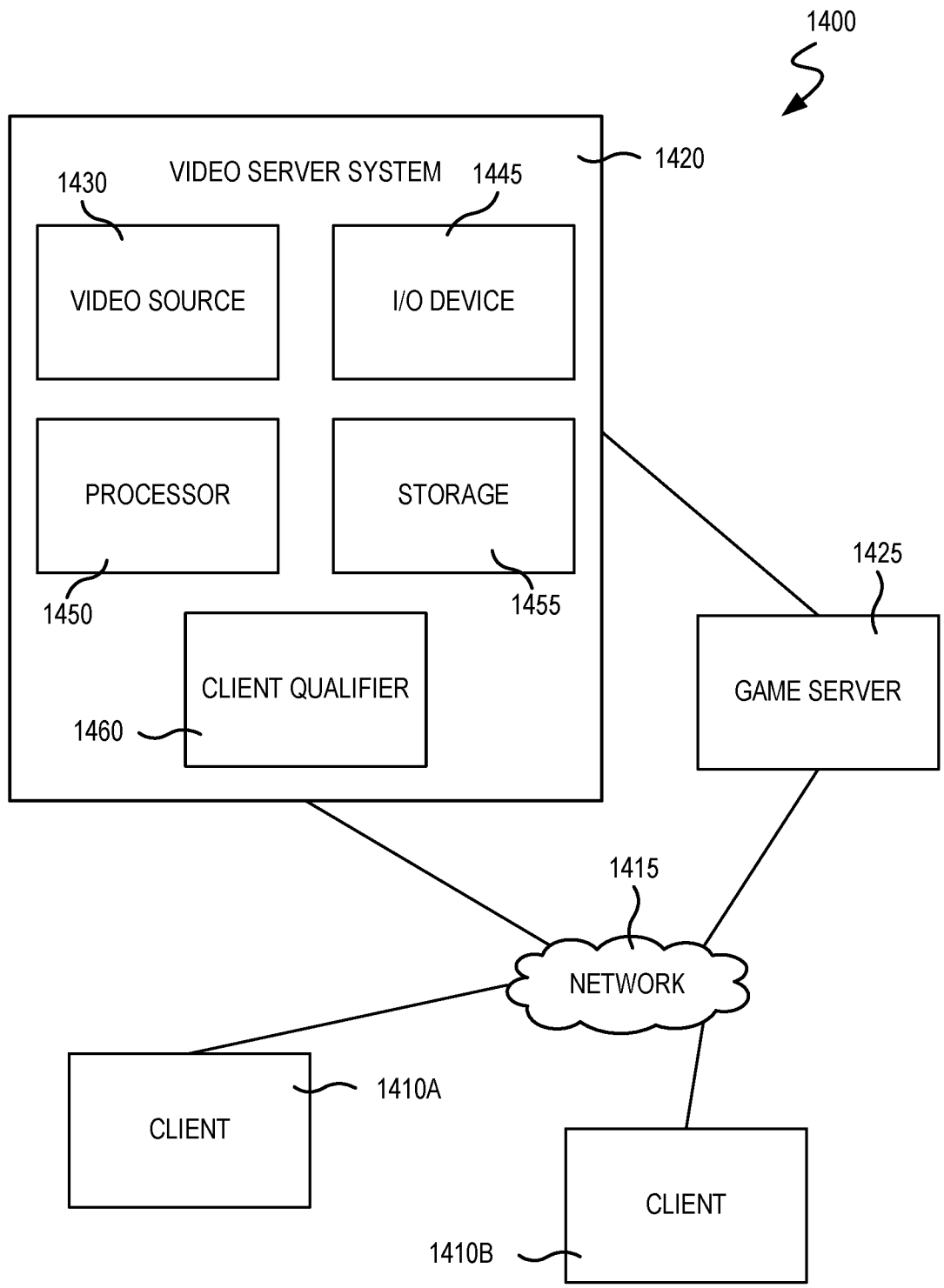
FIG. 8 is a block diagram of a Game System, according to various embodiments of the invention.

FIG. 8 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate.

Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a request for content from a user wearing a head mounted display;
   providing the content for rendering on a first display screen of a head mounted display (HMD) worn by the user, in response to the request;
   detecting a signal to render on a second display screen of the HMD a portion of the content that is being rendered on the first display screen, wherein the second display screen is defined on a front face of the HMD and is visible to a non-HMD user;
   in response to detecting the signal, identifying and selecting the portion of the content that is currently rendering on the first display screen for rendering on the second display screen, wherein the portion of the content is identified to align with a gaze direction of the user viewing the content presented on the first display screen,
   wherein operations of the method are performed by a processor associated with the HMD.

2. The method of claim 1, wherein the signal is temporal based and the portion of the content is provided for rendering on the second display screen for a predefined period of time specified in the signal.

3. The method of claim 1, wherein the portion of the content for rendering on the second display screen is provided for a predefined period of time.

4. The method of claim 1, wherein the signal for requesting the portion of the content is provided by the user wearing the HMD or by a second user using one or more control devices communicatively connected to the HMD.

5. The method of claim 1, wherein the content is interactive game play content generated by a video game selected for game play by the user.

6. The method of claim 1, wherein the content is user generated content provided by the user or by another user.

7. The method of claim 1, wherein the content is obtained from a content source.

8. The method of claim 1, further includes,
   receiving a second signal for switching the content rendering on the first display screen to second content, the second signal generated by the user; and
   in response, presenting a portion of the second content for rendering on the second display screen, the portion of the second content identified and selected to align with the gaze direction of the user wearing the HMD.

9. The method of claim 1, wherein the processor is part of a computing device that is communicatively coupled to the HMD.

10. The method of claim 1, wherein the processor is part of the HMD.

11. A head mounted display, comprising:
    a lens of optics for viewing content;
    a first display screen disposed behind the lens of optics, such that the lens of optics is between the first display screen and an eye of a user, when the head mounted display (HMD) is worn by the user, the first display screen configured for rendering the content;
    a second display screen disposed on a front face of the HMD and facing outward, the second display screen is configured for rendering the content; and
    electronic circuitry communicatively coupled to a processor associated with the HMD, the first display screen and the second display screen, the electronic circuitry used to transmit a signal to the processor, wherein the signal is used to request the processor to, identify, select and transmit a portion of the content that is currently rendering on the first display screen to the second display screen for rendering, wherein the portion of the content is identified to align with using a gaze direction of the user viewing the content presented on the first display screen.

12. The head mounted display of claim 11, wherein the electronic circuitry of the HMD is communicatively connected to a controller, wherein the controller is used to generate the signal for transmitting content rendering on the first display screen to the second display screen for rendering.

13. The head mounted display of claim 12, wherein the controller is a wireless controller.

\* \* \* \* \*